No. 755,700. PATENTED MAR. 29, 1904.
W. E. ROBINSON.
SOAP RECEPTACLE.
APPLICATION FILED OCT. 13, 1902.
NO MODEL.
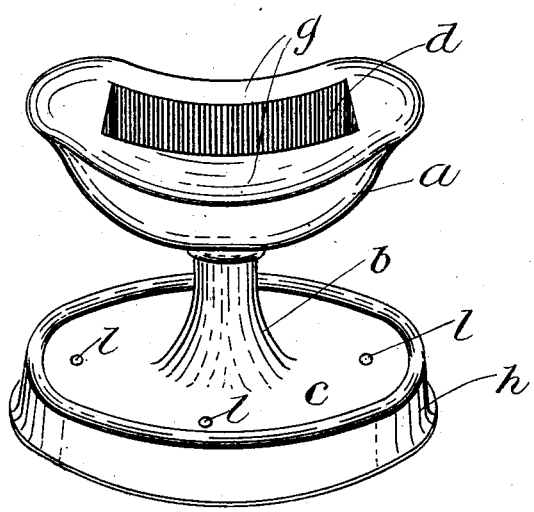
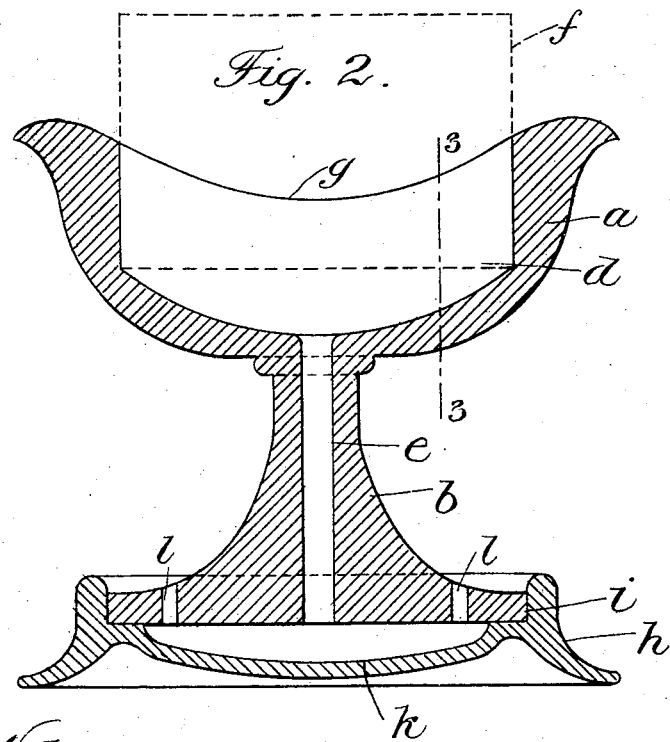
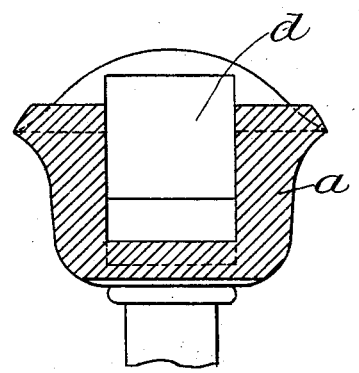
Witnesses:
E. Batchelder
P. W. Pezzetti
Inventor:
W. E. Robinson
by Wright, Brown & Quinby
Attys.

No. 755,700. Patented March 29, 1904.

UNITED STATES PATENT OFFICE.

WILLARD E. ROBINSON, OF MALDEN, MASSACHUSETTS.

SOAP-RECEPTACLE.

SPECIFICATION forming part of Letters Patent No 755,700, dated March 29, 1904.

Application filed October 13, 1902. Serial No. 127,020. (No model.)

*To all whom it may concern:*

Be it known that I, WILLARD E. ROBINSON, of Malden, in the county of Middlesex and State of Massachusetts, have invented certain new and useful Improvements in Soap-Receptacles, of which the following is a specification.

This invention relates to means for holding soap cakes in accessible position for use and so constructed as to enable the cakes to dry after use.

The object of this invention is to provide a soap-receptacle which shall be neat and ornamental in appearance, which may support a cake of soap edgewise, whereby it may drain more quickly, and also to enable the cake to be more readily removed from the receptacle for use. Incidentally one of the objects of this invention is to provide a soap-receptacle particularly designed for receiving and properly supporting a combination cake of soap, such as disclosed in my Patent No. 692,481, granted February 4, 1902.

To the above ends the invention consists in the construction and arrangement of parts substantially as hereinafter described and claimed.

Of the accompanying drawings, Figure 1 represents a perspective view of a receptacle constructed in accordance with my invention. Fig. 2 represents a vertical section through the same, taken in the plane of the greatest diameter of the soap-receiving cavity. Fig. 3 represents a detail section on the line 3 3 of Fig. 2.

In the form represented in the drawings the head of the receptacle is indicated at $a$, said head being provided with a stem $b$, which connects it with a foot $c$, preferably enlarged to such an extent or of such diameter as to guard with certainty against the tipping over of the receptacle owing to the height of the device as a whole.

The head $a$ is provided with a cavity $d$, which is elongated and substantially rectangular, the height of the side walls of the cavity exceeding the lateral width of the cavity in order that when a cake of soap such as that disclosed in my patent above mentioned is placed in said cavity its larger flat sides will be properly supported, so that the cake may not tip over or out of the cavity. The bottom of the cavity is preferably curved or downwardly inclined toward the center, as clearly shown in Fig. 2, and the lower portion of the cavity communicates, by means of a hole $e$, with the bottom of the foot $c$. In Fig. 2 I have represented a cake of soap by the dotted lines $f$. It will be seen that the shape of the depressed portion of the cavity is such that the ends of the cake of soap are supported, while the major portion of the lower edge is free to drain without coming in contact with any portion of the cavity. It will be readily understood that a cake of soap, whether of full size or reduced by use, will rest on the bottom of the cavity with only the ends of its lower edge in contact with said bottom. Therefore the cake will not only drain readily and dry properly, but the lower edge of the cake will preserve its original shape free from indentations such as are liable to be caused by a corrugated bottom. Preferably the sides of the head are depressed, as at $g$, these lower portions of the sides enabling the projecting edge of the cake of soap to be easily grasped when the cake is to be used.

In connection with the receptacle so far described I preferably employ a tray, such as that shown at $h$, said tray having an annular shoulder $i$, on which the outer circumferential edge of the foot $c$ rests. The central portion of the tray is depressed, as at $k$, to form a drainage-receiver. The liquid or soap solution falling through the hole $e$ is caught in the receiver $k$. In order that said receiver $k$ may be properly ventilated, so that the contents thereof may evaporate, I preferably form holes $l$ in the foot $c$.

It will be seen that I have provided an ornamental and useful device that is of special use in connection with a cake of soap such as that shown in my patent above mentioned, inasmuch as the pumice-section of the cake described and claimed in that patent may appear at the top of the cavity, so that it is in position for use without the removal of the cake. Obviously such exposed edge may be used without lifting the cake out of the cavity by simply drawing the moistened hand over the upper edge of the cake.

I claim—

1. A soap-receptacle having a soap-receiving cavity formed to support a cake of soap edgewise and having its bottom curved from end to end whereby said cake, when full size or reduced by use, will rest with only the ends of its lower edge in contact with said bottom.

2. A portable soap-receptacle having an elongated substantially rectangular soap-receiving cavity, the height of the side walls exceeding the lateral width of the cavity, whereby a cake of soap may be supported in edgewise position, the sides of the cavity being depressed at the center, and the bottom of the cavity being deeper at the center than at the ends.

3. The combination with a soap-receptacle comprising an enlarged foot-piece, a hollow stem, and a head having a soap-receiving cavity, of a separable base-tray for receiving said foot-piece, the said base-tray being formed with an internal shoulder and a central depressed portion, and the foot-piece being provided with a ventilating-opening.

In testimony whereof I have affixed my signature in presence of two witnesses.

WILLARD E. ROBINSON.

Witnesses:
C. F. BROWN,
E. BATCHELDER